April 27, 1943.	P. M. FREER	2,317,599
BRAKE
Filed Feb. 27, 1941
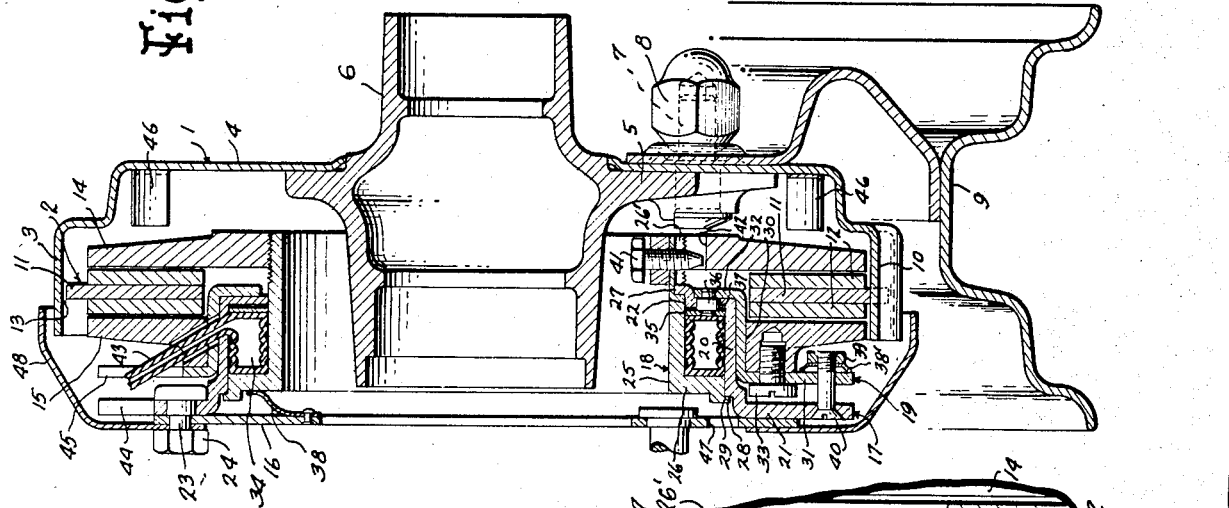
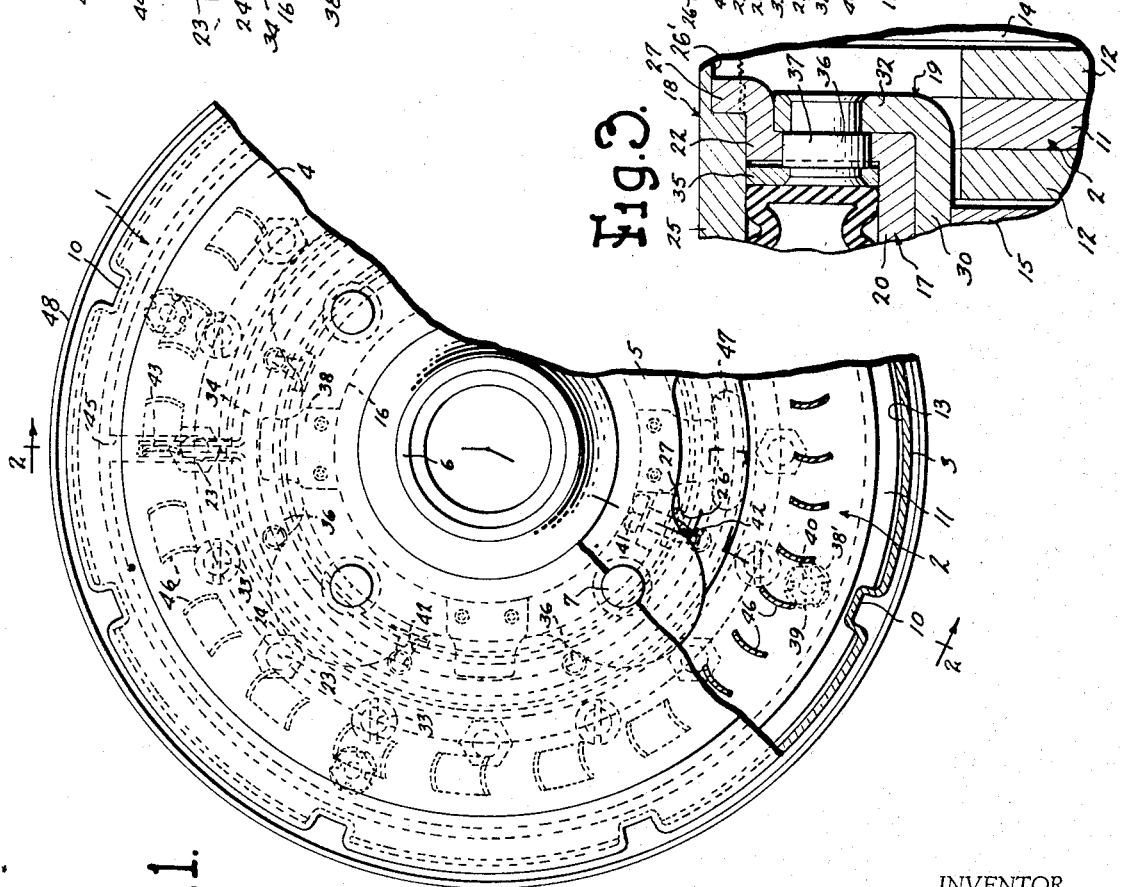
INVENTOR.
Phelps M. Freer
BY
Attorneys Patented Apr. 27, 1943

2,317,599

UNITED STATES PATENT OFFICE 2,317,599

BRAKE

Phelps M. Freer, Detroit, Mich.

Application February 27, 1941, Serial No. 380,913

9 Claims. (Cl. 188—72)

The invention relates to brakes and refers more particularly to disc brakes for use in automobiles, airplanes, and the like.

The invention has for one of its objects to provide a disc brake so constructed that a predetermined clearance is automatically secured between two relatively rotatable friction members of the brake.

The invention has for another object to provide a disc brake comprising relatively rotatable friction elements one of which is formed of friction members movable axially into and out of engagement with the opposite friction faces of the other element.

The invention has for a further object to provide a disc brake formed of three friction members and so arranged that but one friction member need be manually adjusted to secure predetermined clearance between the adjacent friction faces of all three friction members.

With these and other objects in view, the invention resides in the novel features of construction and combinations and arrangements of parts as more fully hereinafter set forth.

In the drawing:

Figure 1 is an elevation, partly broken away, of a brake embodying my invention;

Figure 2 is a cross section on the line 2—2 of Figure 1;

Figure 3 is an enlarged view of a portion of Figure 2.

As illustrated in the present instance, the rotatable element of the brake comprises the drum 1 and the friction member 2. The drum is formed of the annular flange 3 and the web 4, which latter is mounted upon the fixed flange 5 of the hub 6. The fixed flange is provided with the bolts 7 which secure the web to the fixed flange and which are threadedly engaged by the nuts 8 for detachably securing the wheel 9 to the fixed flange. The annular flange 3 is provided with means for keying the friction member 2 thereto and allowing the friction member to move axially. In detail, the annular flange is formed with the axially extending radially inwardly depressed channel-shaped ribs or keys 10 which are equally spaced about the periphery of the annular flange. The friction member 2 is formed of the flat annular disc 11 which extends radially inwardly from the annular flange 3 and has secured to its opposite faces the friction linings 12, the radially outer edges of which are spaced from the annular flange. The disc has a sliding fit with the ribs and its periphery between the ribs is radially spaced from the adjacent portions of the annular flange to provide the openings 13 for the axial passage of air.

The non-rotatable element of the brake comprises the friction members 14 and 15 which are respectively engageable with the outboard and inboard friction faces of the friction member 2. The friction members 14 and 15 form, in effect, discs, the latter, however, being of angular cross section. The two friction members 14 and 15 are non-rotatably mounted on the fixed backing plate 16. The mounting comprises the collar 17 and the inner and outer sleeves 18 and 19 respectively. The collar has the axial portion 20, the radially outwardly extending flange 21 at its inboard end and the radially inwardly extending flange 22 at its outboard end. The collar is secured to the backing plate by the bolts 23 which extend through the flange 21 and the backing plate and the nuts 24 threaded on the inboard ends of the bolts.

The inner sleeve 18 has the axial portion 25 which slidably engages the outboard flange 22 of the collar. The sleeve has at its inboard end the radially outwardly extending flange 26 which slidably engages the axial portion 20 of the collar 17. The outboard end of the axial portion 25 is externally threaded for engagement by the outboard friction member 14.

For holding the inner sleeve from rotation relative to the collar, the outboard end of the axial portion 25 is provided with the external angularly spaced axially extending slots 26' which are engageable by correspondingly spaced projections 27 formed on the outboard flange 22 of the collar. To limit the movement of the inner sleeve in an outboard direction, it is formed at its inboard end with the radial flange 28 which is engageable with the annular shoulder 29 formed on the axial portion 20 of the collar 17.

The outer sleeve 19 has the axial portion 30 which slidably engages the axial portion 20 of the collar 17. The outer sleeve has at its inboard end the radially outwardly extending flange 31 and at its outboard end the radially inwardly extending flange 32 which extends at the outboard side of the outboard flange 22 of the collar. The inboard friction member is sleeved on the axial portion 30 of the outer sleeve and is rigidly secured to the outer sleeve by suitable means, such as the screws 33, which extend through the inboard flange 31 and are threaded into the inboard friction member.

For the purpose of axially moving both of the sleeves 18 and 19 to axially move the friction members 14 and 15 carried by these sleeves into engagement with the friction faces of the friction member 2, there is the actuator 34 which is operatively connected to both sleeves. The actuator is preferably fluid pressure operated and, as shown, comprises an expansible member which is preferably a rubber tube having corrugated radially inner and outer walls. The actuator is located in the annular space between the axial portion 20 of the collar and the axial portion 25 of the inner sleeve. The actuator is operatively connected to the inner sleeve by having its inboard end wall abutting the inboard flange 26 of the inner sleeve. The actuator is operatively connected to the outer sleeve 19 by the ring 35 and the shouldered rivets 36. The ring 35 is located in the annular space between the axial portions of the inner sleeve and the collar and at the inboard side of the outboard flange 22 of the collar, the construction being such that the outboard end wall of the actuator abuts the ring. Each shoulder rivet has the enlarged cylindrical body 37 which slidably extends through the outboard flange 22 of the collar and the length of this body is greater than the thickness of the outboard flange by a predetermined amount, which is equal to the clearance between the friction member 2 and the inboard friction member 15 when they are in inoperative position. This difference is preferably .0010 of an inch. The ring 35 is fixedly riveted against the inboard shoulders of the body portions of the rivets, while the outboard flange 32 of the outer sleeve is fixedly riveted against the outboard shoulders of the body portions of the rivets. With this construction, it will be seen that the outer sleeve 19 has a fixed range of travel between constant predetermined limits, as defined by the outboard and inboard sides of the outboard flange of the collar which form stops for respectively engaging the outboard flange of the outer sleeve, and the ring secured to the outboard flange by the rivets.

The inboard and outboard friction members 14 and 15 respectively are adapted upon release of the fluid pressure to be returned to their inoperative positions by two sets of springs, one set of which is weaker than the other. In detail, 38 are springs secured at one end to the backing plate 16 and abutting at their other ends the inboard flange 26 of the inner sleeve 18. 38' are springs located between the nuts 39 and the inboard flange 31 of the outer sleeve 19. The nuts 39 are threaded upon the screws 40 which extend through the inboard flange 31 and also the inboard flange 21 of the collar 17. The total strength of the springs 38' is less than the total strength of the springs 38, but the strength is sufficient to effect the retraction.

With this construction it will be seen that when the actuator is subjected to fluid pressure it will first act upon the outer sleeve to axially move the inboard friction member 15 a predetermined distance toward the friction member 2. The actuator then acts through the inner sleeve to move the outboard friction member 14 toward the friction member 2. In the event of wear of the friction faces, the inboard axial movement of the outboard friction member causes the friction member 2 to move axially relative to the drum 1 and into engagement with the inboard friction member 15. Upon release of the fluid pressure, it will be seen that the outboard and inboard friction members 14 and 15 will return to their inoperative positions and the friction member 2 will remain in its position of adjustment relative to the drum.

To secure a predetermined clearance between the friction faces of the outboard friction member 14 and the friction member 2, the outboard friction member, as before stated, is adjustably threadedly mounted upon the inner sleeve. It can be located in its various positions of rotative adjustment by means of the set screw 41 which is threadedly mounted on the inner sleeve and is adapted to engage in one of a series of angularly spaced slots 42 in the inner edge of the outboard friction member.

For the purpose of providing for the passage of the conduit 43 which leads to the actuator, the inboard flanges 21 and 31 of the collar and outer sleeve respectively are formed with the radial slots 44 and 45 respectively. To provide for the necessary axial movement of the inboard friction member 15 and the outer sleeve 19, the openings in these members for the passage of the tube 43 are made sufficiently large to provide sufficient clearance for the conduit.

With this construction, it will be noted that a predetermined clearance is automatically secured between the friction faces of the inboard friction member 15 and the friction member 2 on the drum. It will also be noted that both the inboard and outboard friction members 14 and 15 are adapted to be moved axially into and out of engagement with the opposite friction faces of the friction member 2 and that the friction member 2 is axially movable toward the inboard friction member 15, in accordance with wear of the friction faces. It will be further noted that by manually adjusting the outboard friction member 14, predetermined clearances between the adjacent friction faces of all the friction members can be readily secured.

To effect circulation of air, fan blades 46 are secured to the web 4 of the drum radially outwardly beyond the fixed flange 5 of the hub. Also, the backing 16 is formed with the opening 47 in its lower portion and radially inwardly of the inboard flange 21 of the collar for the inlet of air as well as the outlet of lubricant. In operation, during rotation of the drum, the fan blades draw air inwardly through the opening 47 and axially inside the inner sleeve 18 and then force the air beyond the fan blades and through the openings, after which it passes between the annular flange 3 and the encircling portion of the guard 48 which is carried by the backing plate 16.

What I claim as my invention is:

1. In a disc brake, relatively rotatable friction elements, one of said elements comprising an axially movable friction disc, the other of said elements comprising friction members engageable with opposite friction faces of said disc, means for axially moving said friction members toward and away from said disc including means for securing movement of one of said friction members in both directions between predetermined limits.

2. In a disc brake, relatively rotatable friction elements, one of said elements comprising an axially movable friction disc, the other of said elements comprising axially movable friction members engageable with opposite friction faces of said disc, the movement of one of said friction members toward and away from said disc and of said disc toward the other of said friction members being dependent upon the wear of the friction faces, and means for axially moving said friction members toward and away from said disc including means for securing movement of the other of said friction members between constant predetermined limits.

3. In a disc brake, an axially movable friction member, other friction members engageable with opposite friction faces of said first mentioned friction member by a relative axial movement, means for moving said other friction members away from said first mentioned friction member to inoperative position, means for adjusting one of said other friction members to provide a predetermined clearance between the same and said first mentioned friction member when the former is in inoperative position, and means for maintaining a predetermined clearance independently of wear between the other of said other friction members and said first mentioned friction member when the former is in inoperative position.

4. In a disc brake, a drum, a friction member axially movably mounted on said drum, axially movable friction members engageable with opposite friction faces of said first mentioned friction member, sleeves carrying said second mentioned friction members, means for axially moving said sleeves to move said second mentioned friction members toward and away from said first mentioned friction member, and means for limiting the movement of one of said sleeves in both directions.

5. In a disc brake, a drum, a friction member axially movably mounted on said drum, a plate, a second friction member carried by said plate and movable axially to engage its friction face with a friction face of said first mentioned friction member, said first mentioned friction member being movable axially of said drum in accordance with the wear of the friction faces, means on said plate for limiting the movement of said second mentioned friction member toward and away from said first mentioned friction member, and means for moving said second mentioned friction member toward and away from said first mentioned friction member.

6. In a disc brake, a drum, a friction disc within and movable axially of said drum, a backing plate, friction members having friction faces engageable with opposite friction faces of said disc, a collar on said backing plate, sleeves slidable on said collar and carrying said friction members, an actuator operatively connected to said sleeves for moving said friction members toward said disc, spring means operatively connected to said sleeves for moving said friction members away from said disc, the spring means operatively connected to one sleeve being weaker than the spring means operatively connected to the other sleeve, and means on said collar for limiting the movement in both directions of the sleeve operatively connected to the weaker spring means.

7. In a brake, an axially movable friction member having opposite friction faces, friction members movable axially toward and away from said first mentioned friction member and having friction faces engageable with the opposite friction faces of said first mentioned friction member, a backing plate, a collar on said backing plate, sleeves slidable on said collar and operatively connected to said second mentioned friction members to axially move the same, an actuator operatively connected to said sleeves for moving said second mentioned friction members toward said first mentioned friction member, cooperating means on one of said sleeves and collar for limiting the axial movement of one of said second mentioned friction members in both directions, and spring means operatively connected to said second mentioned friction members for moving the same away from said first mentioned friction member.

8. In a brake, an axially movable friction member having opposite friction faces, friction members movable axially toward and away from said first mentioned friction member and having friction faces engageable with the opposite friction faces of said first mentioned friction member, a backing plate, a collar on said backing plate having a radially extending flange at one end, sleeves slidable on said collar and operatively connected to said second mentioned friction members to axially move the same, one of said sleeves having a portion beyond said collar adapted to abut said flange and the other of said sleeves having a radially extending flange and cooperating with said collar to form an annular chamber, an actuator within the chamber, and a member within the chamber between and engageable with said flange of said collar and said actuator and operatively connected to the portion of said sleeve adjacent said collar flange for actuating the same.

9. In a disc brake, relatively rotatable friction elements, one of said elements having friction faces, the other of said elements comprising friction members engageable with said friction faces, means for axially moving said friction members in opposite directions toward said friction faces and also away from said friction faces including means for securing movement of one of said friction members in both directions between predetermined limits.

PHELPS M. FREER.